Jan. 9, 1951  E. C. DECKER  2,537,656
FOOD CONTAINER AND COOLER
Filed Jan. 21, 1947  2 Sheets-Sheet 1

INVENTOR.
ELIZABETH C. DECKER
BY
Mason & Graham
ATTORNEYS

Jan. 9, 1951          E. C. DECKER          2,537,656
FOOD CONTAINER AND COOLER
Filed Jan. 21, 1947          2 Sheets-Sheet 2
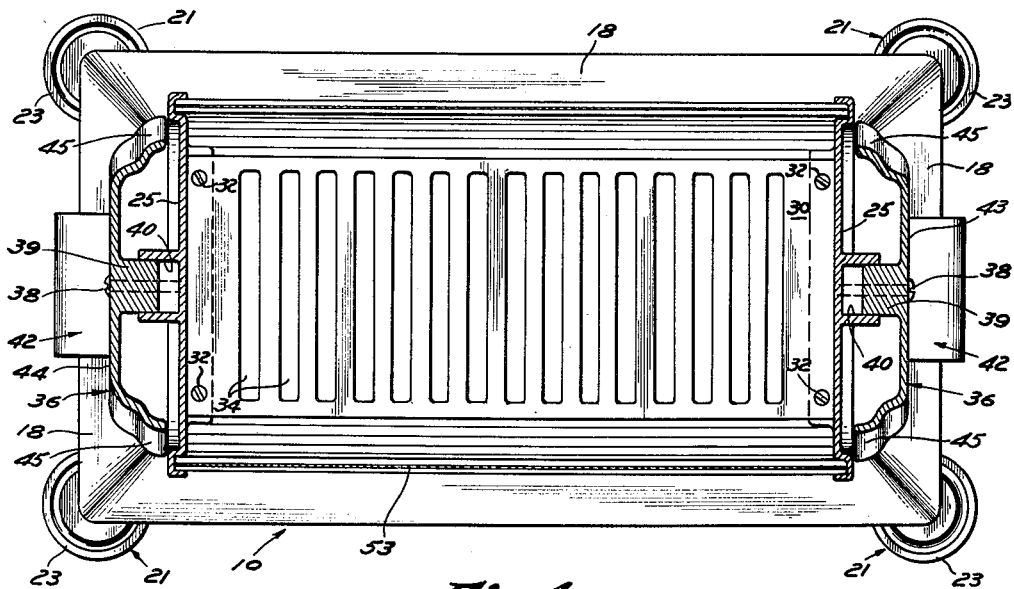
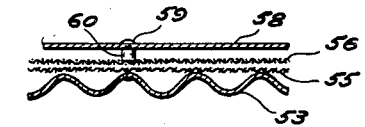
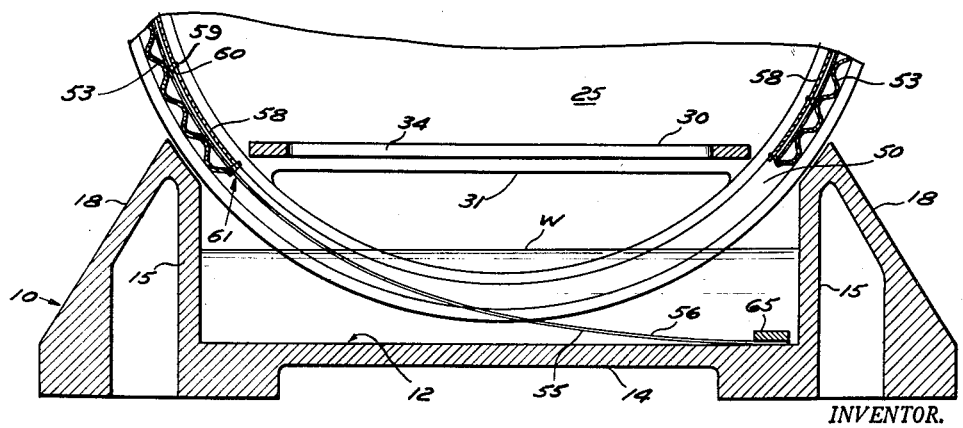
INVENTOR.
ELIZABETH C. DECKER
BY
Mason & Graham
ATTORNEYS Patented Jan. 9, 1951

2,537,656

UNITED STATES PATENT OFFICE 2,537,656

FOOD CONTAINER AND COOLER

Elizabeth C. Decker, Los Angeles, Calif.

Application January 21, 1947, Serial No. 723,315

4 Claims. (Cl. 62—139)

This invention relates generally to household food containers designed to keep articles of food cool, and particularly to coolers wherein the cooling is accomplished by the evaporation of water.

It is an object of the invention to provide a novel improved food container adapted to keep food cool but not so cold as to render it objectionably hard, as in the case of butter and similar things, or objectionably viscous, as in the case of syrups, honey and the like.

It is a particular object of the invention to provide a cooler of the type indicated having a novel form of cover embodying an evaporative wick of substantial area and providing for the circulation of air to the wick.

It is also an object to provide for the circulation of air in the food compartment portion of the container apart from the region where the evaporation of water from the wick takes place.

Another object is to provide a food container designed to provide a moist or humid food storage compartment suitable for keeping foods moist.

It is a further object of the invention to provide an attractive, easily operated food container of the cooler type adaptable for incorporating means to prevent the entry of ants.

These and other objects will be apparent from the drawings and following description thereof. Referring to the drawings, which are merely illustrative of one form that the invention may take:

Fig. 4 is a sectional plan view on line 4—4 of Fig. 1;

Fig. 5 is an enlarged fragmentary cross section of the device; and

Fig. 6 is an enlarged fragmentary section showing the cover construction.

Figure 1:
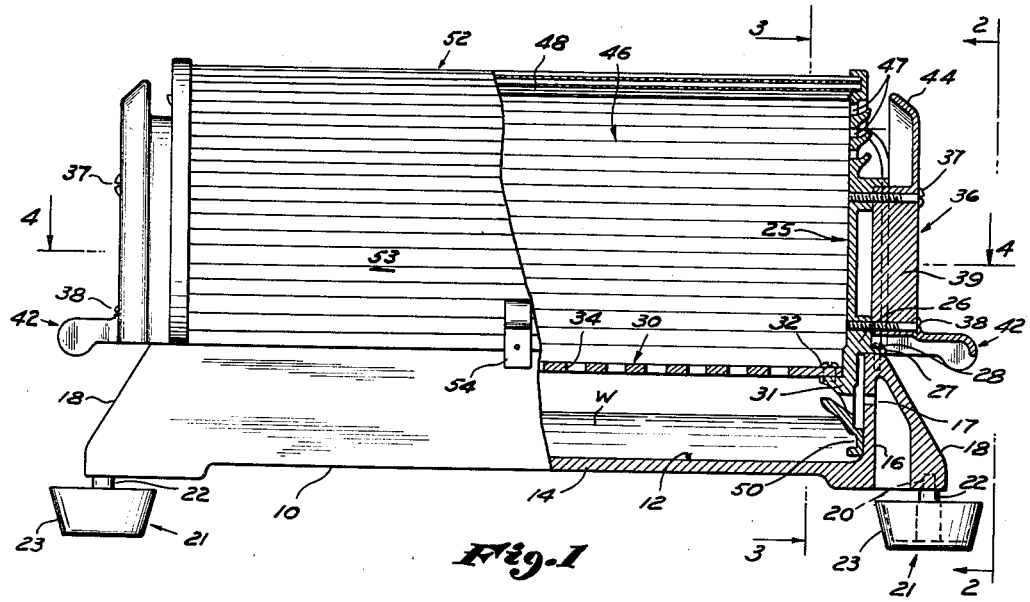
Fig. 1 is a front elevation and longitudinal sectional view through a device embodying the invention.
Figure 2:
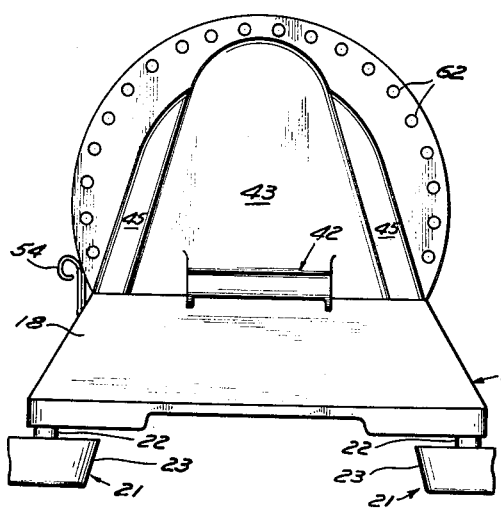
Fig. 2 is an end view of the device taken on line 2—2 of Fig. 1.

Referring to the drawings, reference numeral 10 generally indicates a base which is in the form of a pan or receptacle provided with an ornamental outer wall. The pan is generally indicated by numeral 12 and includes a bottom wall 14, side walls 15, and end walls 16. As indicated in the drawings, the pan is adapted to hold a supply of water W. The end walls 16 of the pan are provided with perforations 17 to permit circulation of air. Outwardly of the pan, the base is provided with the ornamental outer wall 18 which extends around the pan in spaced relation thereto.

The ornamental outer wall is provided with four bores 20 located one at each corner to accommodate ant cups 21 consisting of a central stem 22 received within the bores and the cup element 23. These cups may be partially filled with water to repel ants.

The pan supports a pair of substantially circular end plates 25 located one at each end of the base. These plates each have an exterior ledge 26, 27 adapted to seat on the upper edge at each end of the base and be secured thereto by means of screws 28. A floor 30 is supported by the end plates, the floor resting on the inwardly extending ledge 31 on each plate and being secured thereto by the screws 32. The floor presents a surface upon which articles of food may be placed and preferably is of a perforate construction so as to allow for the circulation of air and the consequent evaporation of water from the pan. In the form shown, the floor is provided with a plurality of transverse slots 34. The end plates 25 are each adapted to support an end bell member 36. These end bells may be secured to the plates by screws 37 and 38 and by means of a rib 39 on each end bell projecting into a channel 40 on the exterior of each plate. Each end bell is provided with a handle 42 which, in the form shown, may consist of a central flat plate portion 43 which converges toward its upper end and terminates in arcuate upper inwardly projecting portion 44. The central portion is flanked by the two inwardly curved side portions 45. The handles 42 may be used to manually transport the device from place to place and enable a person to hold the device substantially level during transport.

In order to provide for the circulation of air through the food compartment generally indicated by 46, the plates 25 are provided with transverse louvers 47 in their upper portions and these are concealed from direct view by the end bells 36.

At their upper ends the plates 25 are connected by a tie rod 48 extending between them and mounted therein in any suitable manner.

Each end plate is formed to provide an annular channel 50 adapted to accommodate the ends of a slidable cover 52. This cover includes an outer thin sheet of corrugated metal 53 which may have fastened thereto a handle 54. Inwardly of the sheet and adjacent the inner convolutions thereof, there is mounted a wick sheet 55 (Fig. 6) which may be formed of any suitable material which readily absorbs water. Preferably this wick is covered with a non-metal mesh of fabric or plastic, indicated at 56. Spaced inwardly of the wick is a thin gauge flexible metal plate 58. The parts are secured together at intervals by means of cotter pins 59 and suitable spacing is maintained between the inner plate and the wicking by the washers 60. The inner end of the wick and layer of mesh may extend beyond the inner end 61 of the cover and be secured to the bottom of the pan as by a bar 65.

Figure 3:
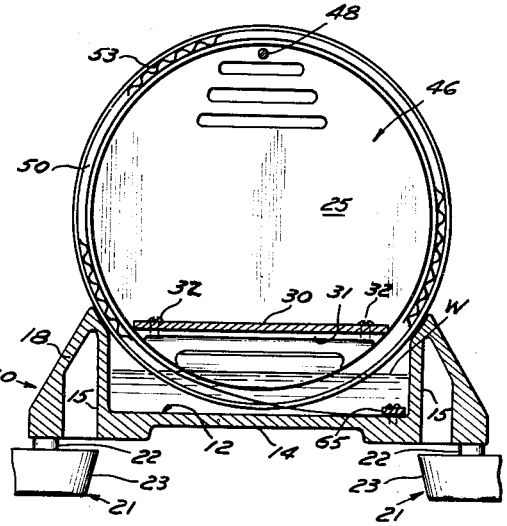
Fig. 3 is a cross section on line 3—3 of Fig. 1.

The cover 52 may be opened by raising the handle 54 and rotating the cover counterclockwise as viewed in Fig. 3, the ends of the cover being slidable in the channels 50 of the end plates.

In order to provide for circulation of air through the cover independently of the food compartment to cause evaporation of water from the wick, the end plates are provided with a series of perforations 62 in the region of the channels 50.

With the construction outlined, an attractive, well ventilated cooler is provided. Evaporation of water from the wick takes place continually as a result of air circulating through the interior of the cover through the medium of holes 62 in the cover housing plates, serving to keep the food compartment cool. At the same time, a certain amount of air circulates through the food compartment, entering and leaving through the louvers 47 in the housing plates. With the perforate floor construction, some water evaporates from the pan, further cooling the interior of the device.

Although the invention has been particularly shown and described with reference to a single illustrated embodiment thereof, it is contemplated that various changes and modifications can be made without departing from the scope of the invention as set forth in the claims.

I claim:

1. A food container cooler comprising a base forming a receptacle for a supply of water, a cover housing including a pair of spaced end plates extending upwardly from said base and extending into the interior thereof, a floor extending between said plates, said plates each being provided with an annular channel on their inner sides, a cover extending between said plates and cooperating therewith to form a food compartment above said floor, said cover having its ends slidably received in said channels, and a water absorbent wick mounted on the inner side of said cover and extending into said receptacle.

2. A food container cooler comprising a base forming a receptacle for a supply of water, a cover housing including a pair of spaced end plates extending upwardly from said base and extending into the interior thereof, a floor extending between said plates, said plates each being provided with an annular channel on their inner sides, a cover extending between said plates and cooperating therewith to form a food compartment above said floor, said cover having its ends slidably received in said channels, a water absorbent wick mounted on the inner side of said cover and extending into said receptacle, and a flexible plate mounted on said cover and spaced inwardly of said wick, said end plates being provided with holes in the region of said channels for permitting circulation of air between the cover and said flexible plate whereby water may be evaporated from said wick.

3. A food container cooler as defined in claim 2 in which said cover is formed of a thin sheet of corrugated metal.

4. A food container cooler comprising a base forming a receptacle for a supply of water, a cover housing including a pair of spaced end plates extending upwardly from said base and extending into the interior thereof, a floor extending between said plates, said plates each being provided with openings in the upper portion thereof, a movable cover extending between said plates, an end bell member mounted on the outer side of each of said end plates, said members being constructed and formed to conceal from direct view openings provided in said end plates while permitting circulation of air therethrough and being formed to provide a handle.

ELIZABETH C. DECKER.

REFERENCES CITED

The following references are of record in the file of this patent:

UNITED STATES PATENTS

| Number | Name | Date |
| --- | --- | --- |
| 1,275,191 | Adair | Aug. 13, 1918 |
| 1,327,214 | Richardson | Jan. 6, 1920 |

FOREIGN PATENTS

| Number | Country | Date |
| --- | --- | --- |
| 456,990 | Great Britain | Nov. 19, 1936 |